United States Patent Office 3,637,608
Patented Jan. 25, 1972

3,637,608
METHOD OF REGULATING THE POLYMERIZA-
TION RATE IN THE ANIONIC POLYMERIZA-
TION OF LACTAMS
Siegfried Schaaf and Clau Berther, Chur, Grisons, Switzerland, assignors to Inventa AG fur Forschung und Patentverwertung Zurich
No Drawing. Filed Sept. 25, 1969, Ser. No. 861,150
Claims priority, application Switzerland, Oct. 9, 1968,
15,078/68
Int. Cl. C08g 20/18
U.S. Cl. 260—78 L      7 Claims

ABSTRACT OF THE DISCLOSURE

The method relates to the polymerization of lactams having more than 6 member rings, at a temperature in the range of 130–180° C. An alkaline polymerization catalyst and a mixture of cocatalysts is employed in the polymerization reaction. The cocatalyst mixture consists of from 30–70% of a high-activity cocatalyst comprising acetyllactams, acid chlorides, acid anhydrides, cyanamides, isocyanates, ketenes, and oxazolidinedione derivatives, and the balance consisting of polycarbodiimides.

---

This invention relates to a method of regulating the polymerization rate of lactams. More particularly, the invention relates to a method of regulating the rate of anionic polymerization of lactams having more than 6 member rings.

The process of anionic polymerization has achieved importance in the manufacture of articles from polylactams by means of moldings or rotary and centifugal castings. The range of articles manufactured by said molding and casting methods varies from relatively thin walled articles weighing only a few pounds to large diameter or thick walled pipes weighing a few hundred pounds. These items are produced both on an industrial basis in large scale as well as on an individual basis. Due to the highly exothermic nature of anionic polymerization, the "pot time" in the production of castings becomes critical. The "pot time" is defined as the time interval between the catalyst addition until solidification occurs. In the manufacture of large diameter castings, too short a pot time results in solidification occurring first in the cooler mold walls with further crystallization not occurring until later in the hotter interior. This results in the formation of vacuum shrinkage cavities. Furthermore, the heat of polymerization cannot be removed quickly enough from the interior of the block to prevent overheating said interior and thereby producing stresses and distortion. On the other hand, short pot times are preferred in the manufacture of thin walled articles.

The great variety of items which are manufactured from molds and castings imposes a requirement of flexibility on the polymerization catalysts used in the reactions. This means that relatively slow-acting catalysts producing correspondingly long pot times are needed for the manufacture of large blocks while rapidly acting catalysts and correspondingly short pot times are needed for the manufacture of, say, thin-walled pipes.

The selection of suitable catalysts or cocatalysts has heretofore been quite limited. Examples of rapidly acting catalysts include acetyllactams or compounds having an acetylating action, such as acid chlorides or anhydrides, cyanamides, isocyanates and ketenes. The use of these catalysts is restricted to the manufacture of relatively thin-walled moldings at reaction temperatures of about 120–180° C. For larger moldings these rapidly acting cocatalysts cannot be used because of the reasons mentioned above.

Accordingly, it is an object of this invention to provide a method of regulating the rate of anionic polymerization of lactams.

A further object of this invention is to provide a method of regulating the anionic polymerization rate of lactams having more than 6 member rings.

A still further object of this invention is to provide a method of adjusting the pot time in the manufacture of polylactam moldings, thereby producing stress-free castings of reproducible quality.

A method has now been found of regulating the polymerization rate in the anionic polymerization of lactams having more than 6 member rings, in a temperature range of 130–180° C. The polymerization is carried out in the presence of an alkaline polymerization catalyst and a mixture of cocatalysts. The cocatalyst mixture is characterized in that it consists of from 30.70 mol percent of a cocatalyst of "high" activity and the balance of a polyized in that it consists of from 30–70 mol percent of a cocatalyst and a "low" activity cocatalyst is set at a pot time of 20 minutes when sodium hydride (50% in oil) is employed as an alkaline polymerization catalyst and the reaction is carried out at a temperature of 150° C.

The lactams used in the polymerization are those having 6–13 member rings, in particular, caprolactam, laurin lactam and mixtures thereof.

Alkaline polymerization catalysts which may be used include, for instance, lactam-metal compounds containing a metal atom bound to the nitrogen, such as sodium lactam, or substances which react with a lactam to produce said lactam-metal compounds, such as metallic sodium, Grignard compounds or alkali hydrides.

Examples of cocatalysts of high activity include acetyllactams, acylating agents such as acid chlorides and anhydrides, cyanamides, isocyanates, ketenes or oxazolidinedione derivatives. A preferred cocatalyst mixture consists of acetylcaprolactam or 2,3-dioxo-2,3,5,6,7,8-hexahydrooxazolo-(3,2, alpha)-azepine (azepine being prepared by the reaction of 1 mol of caprolactam and 1 mol of oxalyl chloride) as a cocatalyst of high activity, and poly-(dimethylphenylene) polycarbodiimide (see, with regard to the carbodiimide, U.S. Pat. 3,538,060). The preferred concentration of the cocatalyst mixture described above is between 0.1–3.0 mol percent, based on the particular lactam used in the polymerization reaction. The range between 0.2–0.8 mol percent has been found to be particularly effective.

The use of the cocatalyst mixture of the instant invention in a lactam polymerization process permits careful control of the reaction rate and thereby allows for the proper removal of heat. This is essential in order to produce stress-free castings of reproducible quality. A further advantage of the method according to this invention is that castings can be obtained with good economy in various sizes directly from the starting materials. Longer pot times may also be achieved by using a polycarbodiimide as the sole catalyst. However, this adversely affects the economy of the process since removal of the castings from the molds is carried out over a longer cycle time. Conversely, the use of the highly active cocatalysts by themselves results in too short a pot time concomitant with the previously described drawbacks.

The following examples are set forth to more particularly illustrate the invention. However, they are not to be construed as limiting.

EXAMPLE 1

Caprolactam polymerization reactions were carried out in 5 separate beakers in the presence of a cocatalyst mixture consisting of acetylcaprolactam as a cocatalyst of high activity and poly-(dimethylphenyl) carbodiimide.

The ratio of high activity cocatalysts to the polycarbodiimide was varied. 2 kg. of caprolactam were heated in each case to 150° C. and 5 g. of a suspension of sodium hydride in oil (50:50) were added in each instance under nitrogen.

The results are shown in Table 1. Column V of the table gives the times of addition of the cocatalyst mixture until complete solidification and removal from the molds. The cocatalyst mixture was used in a concentration of 0.3 mol percent, based on the lactam. Tests 1 and 5 were run for comparative purposes.

TABLE 1

| Test | Acetyl-caprolactam (AL), g. | Polycarbodiimide (PCD), g. | Molar ratio AL:PCD | Pot time, min. | Remarks |
|---|---|---|---|---|---|
| 1 | 7.35 | | 100:1 | 12 | Shrinkage cavities and stresses. |
| 2 | 4.70 | 2.87 | 70:30 | 25 | |
| 3 | 3.93 | 3.64 | 50:50 | 40 | |
| 4 | 3.14 | 4.35 | 40:60 | 65 | |
| 5 | | 7.25 | 0:100 | 75 | |

EXAMPLE 2

In a similar manner as described in Example 1, polymerizations of 2 kg. of a mixture of caprolactam and laurin lactam (weight ratio 85:15) were carried out. The same catalyst concentrations and the same oven temperature were used. The concentration of cocatalyst was 0.3 mol percent, based on the lactam. The results are shown in Table 2.

TABLE 2

| Test | Acetyl-caprolactam (AL), g. | Polycarbodiimide (PCD), g. | Molar ratio AL:PCD | Pot time, min. | Remarks |
|---|---|---|---|---|---|
| 6 | 7.35 | | 100:0 | 15 | Shrinkage cavities. |
| 7 | 4.40 | 2.20 | 70:30 | 35 | |
| 8 | 3.67 | 3.47 | 50:50 | 40 | |
| 9 | 2.94 | 4.05 | 40:60 | 60 | |
| 10 | | 6.80 | 0:100 | 80 | |

EXAMPLE 3

Two further series of tests were run using polycarbodiimide and an oxazolidinedione derivative (prepared by the reaction of oxalyl chloride and caprolactam in a molar ratio of 1:1) as a cocatalyst mixture. The same molar ratios were used as in Examples 1 and 2. Pot times similar to those obtained in Examples 1 and 2 were obtained both for the polymerization of caprolactam and for the copolymerization of laurin lactam and caprolactam (weight ratio 85:15).

What is claimed is:

1. In a method for regulating the rate of polymerization of a lactam having more than six carbon members in its ring, in the anionic polymerization of same into a moldable polymer, said polymerization being carried out at a temperature of 130–180° C., and in the presence of an alkaline polymerization catalyst, the improvement wherein the polymerization is also carried out in the presence of a co-catalyst mixture comprising 30–70 mol percent of a high activity catalyst selected from the group consisting of acetylcaprolactam and 2,3-dioxo-2,3,5,6,7,8-hexahydro-oxazolo-[3,4,α]-azepine, and 70–30 mol percent of a polycarbodiimide, said polycarbodiimide being a mixture of polycarbodiimides of the recurring unit

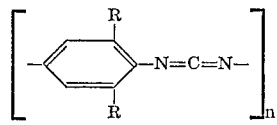

wherein R is an alkyl having 1–4 carbon atoms and $n$ is 3 to 100.

2. A method according to claim 1 wherein the alkaline polymerization catalyst is an alkali hydride.
3. A method according to claim 1 wherein the high activity cocatalyst is acetylcaprolactam and the polycarbodiimide is poly-(dimethylphenylene) carbodiimide.
4. A method according to claim 1 wherein the high activity catalyst is 2,3 - dioxo-2,3,5,6,7,8-hexahydro-oxazolo-[3,2,α]-azepine and the polycarbodiimide is poly-(dimethylphenylene) carbodiimide.
5. A method according to claim 1 wherein the concentration of the cocatalyst mixture is 0.1–3.0 mol percent based on the particular lactam used.
6. A method according to claim 1 wherein the concentration of the cocatalyst mixture is 0.2–0.8 mol percent based on the lactam used.
7. A method according to claim 1 wherein said lactam has 6–13 members in its ring.

References Cited

UNITED STATES PATENTS

| 3,015,652 | 1/1962 | Schnell et al. | 260—78 L |
| 3,234,152 | 2/1966 | Fuller | 260—78 L X |
| 3,427,289 | 2/1969 | Warner | 260—78 L |

FOREIGN PATENTS

| 1,108,721 | 4/1968 | Great Britain | 260—78 L |

WILLIAM H. SHORT, Primary Examiner

L. M. PHYNES, Assistant Examiner